April 17, 1934.　　　R. R. SEARLES　　　1,955,254
SPRING CONNECTION
Filed Jan. 7, 1931
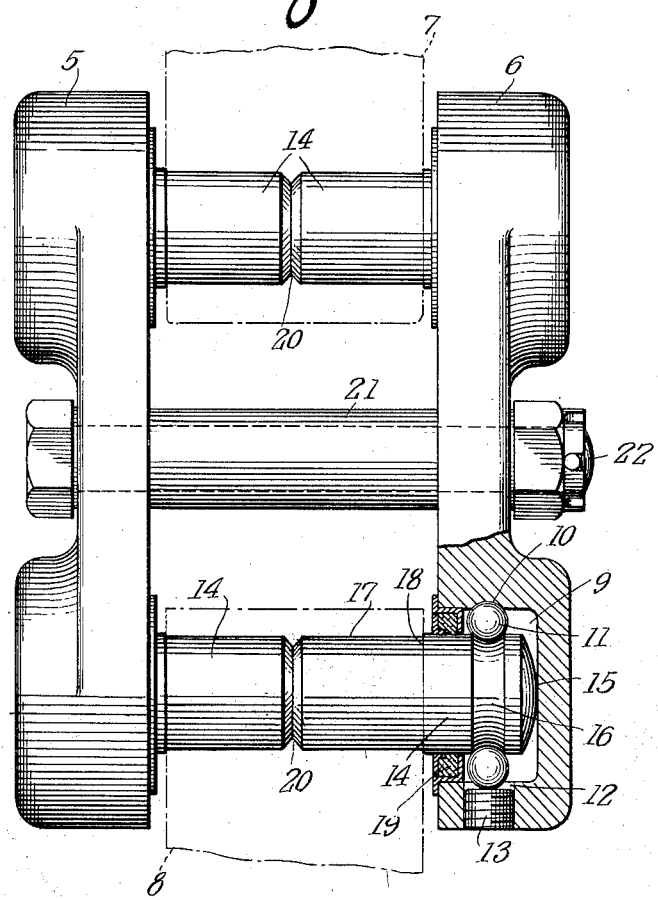
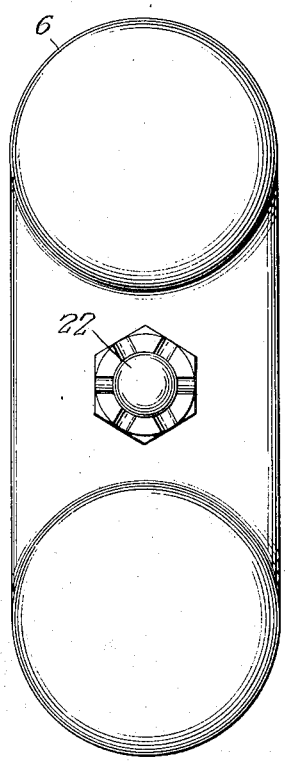
INVENTOR
R. R. Searles
BY
Mitchell Bechert
ATTORNEYS.

Patented Apr. 17, 1934

1,955,254

UNITED STATES PATENT OFFICE 1,955,254

SPRING CONNECTION

Raymond R. Searles, New Britain, Conn., assignor to The Fafnir Bearing Company, New Britain, Conn., a corporation of Connecticut Application January 7, 1931, Serial No. 507,186

6 Claims. (Cl. 267—54)

My invention relates to a spring connection, and more particularly to a spring shackle.

It is an object of the invention to provide an improved spring connection in which various parts are unitarily assembled so as to reduce the number of separate parts to be handled during assembly.

It is a further object to provide a spring connection so arranged as to be readily assembled.

It is a further object to provide a spring connection device which may be substantially completely assembled at the factory and may be readily applied to a vehicle when required.

Other objects and features of invention and novel construction will be hereinafter pointed out or will become apparent upon reading the specification.

In the drawing, which shows, for illustrative purposes only, a preferred form of the invention—

Fig. 1 is a fragmentary end view of a spring and frame connected by a shackle, illustrating features of the invention, a part being shown in section;

Fig. 2 is an edge view of the shackle shown in Fig. 1.

Briefly stated, in a preferred form of the invention I employ connecting members which may be shackle links or other connecting members. At least one of the connecting members, and preferably both, carry unitarily assembled therewith bearing means to be received in an eye, such as the eye of a spring or frame or both. Anti-friction bearing members, such as balls, are preferably interposed between suitable races of the connecting members and the bearing means, such as pins, so as to facilitate free and easy rotary movement between the connecting member and the bearing means. The connecting members are secured to each other in any suitable manner.

In said drawing illustrating a spring shackle, 5—6 indicate complementary shackle links for connecting a frame 7 to a spring 8. Since both links and associated parts are preferably duplicates of each other, a description of one will suffice for both.

Each link has bearing means complementary to the other at spaced points thereon and, in the preferred form, each link is provided with a cup, such as 9, at each end thereof. Interiorly of each cup and preferably formed directly therein is a raceway 10 for anti-friction bearing members, such as balls 11. Each cup may be provided with an opening, such as 12, for facilitating insertion of the balls into the race 10. Such opening 12 may be closed by a plug 13 after assembly.

Both links have complementary bearing members such as pins 14—14, unitarily assembled therewith and rotatable therein respectively. Each pin 14 extends into its cup 9 and may abut the bottom of the cup, as indicated at 15, the pin end being preferably shaped so that only its central portion will bear on the inner end wall of said cup as shown. The pin is provided with a raceway 16 preferably formed directly thereon and complementary to the raceway 10. The balls 11 interposed between the complementary raceways serve to not only rotatably support the pin and link from each other, but likewise serve to unitarily hold the pin and the cup, this being a preferable way of effecting a unitary connection between said parts.

The edges of the spring eye 8 and frame eye 7 are prevented from engaging the links, preferably by means of a shoulder or the like on the pins. As shown, the end 17 of each pin is turned down to fit the eye of the spring and frame, thus leaving a shoulder 18 which may abut the edge of the eye on the spring or frame. A suitable dust excluding and lubricant retaining enclosure 19 is provided for each bearing.

As stated, each link preferably carries a pin member or the like unitarily assembled therewith, as just described, and the opposed pin members preferably abut each other at the center, as indicated at 20, so as to definitely locate the distances between the shackle links when assembled. If desired, a spacer means 21 may be interposed between the links 5—6, and a through-bolt 22 or the like may serve to secure the links to each other securely, the spacer functioning to prevent distortion of the links or the cramping of the anti-friction bearings by an excessive tightening of said bolt.

With a construction of the character indicated it will be seen that the assembly of each link with its two bearing pins and anti-friction bearing members may be unitarily assembled at the factory for packing, transportation and final application at the destination. The pins are first inserted and then the balls may be inserted, for example, through the opening 12, until the requisite number have been placed. The space surrounding the balls is then preferably filled with lubricant and the plug 13 screwed up. Thus, after the shackle links and unitarily assembled parts leave the factory, there is little chance for dirt or grit to enter the bearings before final assembly with the vehicle.

The shackle links with unitarily assembled parts are easily assembled with the vehicle by releasing the bolt 22, separating the sides of the shackle, inserting the reduced ends 17 of the pins in the eyes of the spring and frame and then, by suitable pressure, forcing the links toward each other. With the ends of the pins abutting the bottoms of the cups or capable of such abutment under pressure, assembly will be facilitated and undue pressure on the balls will be avoided during such assembly. The shoulders, such as 18, serve to abut the edges of the eye of the spring and frame at one or both sides, and thus cause the shackle to be substantially symmetrically assembled with the spring and frame with the proper spacing between the ends of the eyes and the inner sides of the adjacent shackle links.

The spacer 21 between the links serves additionally to space and reinforce the links. The through-bolt 22 serves additionally to secure the links together unitarily at the final assembly.

It will be seen that I have provided a spring connection in which a minimum number of separate parts are shipped from the factory. There is little likelihood of dirt or grit entering the bearings, and little likelihood of loss of lubricant and no danger of loss of parts. Final assembly is a simple matter.

While the invention has been shown as embodied in a spring shackle, the principles of the invention are equally applicable to other spring connections, such as so called hinge end connections.

While the invention has been described in considerable detail, it is to be understood that various changes may be made within the scope of the invention as defined in the appended claims.

I claim:

1. In a spring connection, a shackle link having two spaced bearing cups, said cups being grooved to form annular substantially continuous raceways for anti-friction bearing members, bearing pins extending into each said cup and having a groove therein forming a raceway for anti-friction bearing members, one of said grooves having a filling opening for anti-friction bearing members and anti-friction bearing members interposed between the grooves in said cups and the grooves in said pins, whereby said anti-friction bearing members will hold each link and its bearing pins unitarily assembled for application to and removal from one side of the parts to be connected without separation of said link from said pins and anti-friction members.

2. In a spring connection, a connecting member having a cup therein, a pin member extending into said cup, and anti-friction bearing members interposed between said cup and pin member for rotatably supporting said pin in said cup and holding said pin and cup unitarily assembled, the end of said pin bottoming in said cup.

3. A shackle comprising two links having opposed cupped recesses, two complementary bearing pins each bottomed at one end in one of said recesses, anti-friction bearing members between the circumferential wall of each recess and the side of the pin end therein to hold said parts in assembled relation as a unit and to permit said pins to turn freely in said recesses, parts of said pins projecting beyond the recesses to enter the opposite ends of a bore in a part to be shackled.

4. A shackle comprising two links having opposed complementary recesses therein, two complementary pins, one end of each pin extending into one of said recesses to bottom therein, anti-friction bearing members mounted in each of said recesses and extending around the pin end therein and holding the same in place, part of each pin projecting beyond the recess in its supporting link whereby the projecting ends of said complementary pins may be entered into the opposite ends of a bore in a part to be shackled.

5. A shackle comprising two links having opposed complementary recesses therein, two complementary pins, one end of each pin extending into one of said recesses to bottom therein, anti-friction bearing members mounted in each of said recesses and extending around the pin end therein and holding the same in place, part of each pin projecting beyond the recess in its supporting link whereby the projecting ends of said complementary pins may be entered into the opposite ends of a bore in a part to be shackled, and a closure for the space between each pin and the open end of each cup to exclude foreign matter from and to retain lubricant in each cup.

6. A shackle comprising two links having opposed complementary recesses therein, two complementary pins, one end of each pin extending into one of said recesses to bottom therein, anti-friction bearing members mounted in each of said recesses and extending around the pin end therein and holding the same in place, part of each pin projecting beyond the recess in its supporting link whereby the projecting ends of said complementary pins may be entered into the opposite ends of a bore in a part to be shackled, the end of each pin being shaped so that a portion only of said end will bear on the adjacent bottom wall of its respective recessed support.

RAYMOND R. SEARLES.